United States Patent

[11] 3,607,600

[72] Inventors Robert E. Schreter
Lebanon;
John A. Marino, Palmyra, both of Pa.
[21] Appl. No. 842,832
[22] Filed July 15, 1969
[45] Patented Sept. 21, 1971
[73] Assignee Hauck Manufacturing Company
Lebanon, Pa.

[54] COMPOSITE MOLDING PROCESS AND PRODUCT
16 Claims, 3 Drawing Figs.
[52] U.S. Cl. .................................................. 161/156,
156/245, 156/276, 156/289, 161/170, 161/190,
161/253, 161/255, 264/213, 264/214, 264/257,
264/331
[51] Int. Cl. .................................................. B32b 7/04,
B32b 25/02, B32b 25/04, B32b 25/10
[50] Field of Search .......................................... 156/245,
276, 289; 161/53, 125, 156, 170, 184, 190, 227,
231, 257, 253, 255; 264/213, 214, 257, 258, 135,
299, 331; 117/72.77, 138.8

[56] References Cited
UNITED STATES PATENTS
2,715,085  8/1955  Boyer .......................... 161/254 X
2,769,742  11/1956  Helbing ........................ 156/246
3,278,667  10/1966  Knox ............................ 264/257 X
3,318,727  5/1967  Boenig et al. ................. 117/118

Primary Examiner—William A. Fowell
Attorney—Finnegan, Henderson & Farabow

ABSTRACT: Strong, abrasion-resistant composite molded articles are produced that include a reinforced synthetic resin backing layer and an elastomeric surface layer that is molded to predetermined dimensions. The articles are molded by applying a first coating of an elastomer on a treated mold surface and then curing the elastomer just enough to produce a tack-free surface. A second coating of liquid elastomer is applied to the tack-free surface and fibers are deposited on the liquid coating of elastomer and worked to form a continuous fiber coating. Subsequently, at least one layer of reinforced synthetic resin is applied and rolled into the exposed surface of the fibers before the second elastomer coating solidifies. The fibers which extend from the second elastomer coating into the backing layer provide a strong mechanical bond that prevents separation of the elastomer layers from the synthetic resin. A porous reinforcing mat can be inserted into the first coating of elastomer while it is liquid to dramatically increase the article's tear strength and flexural strength.

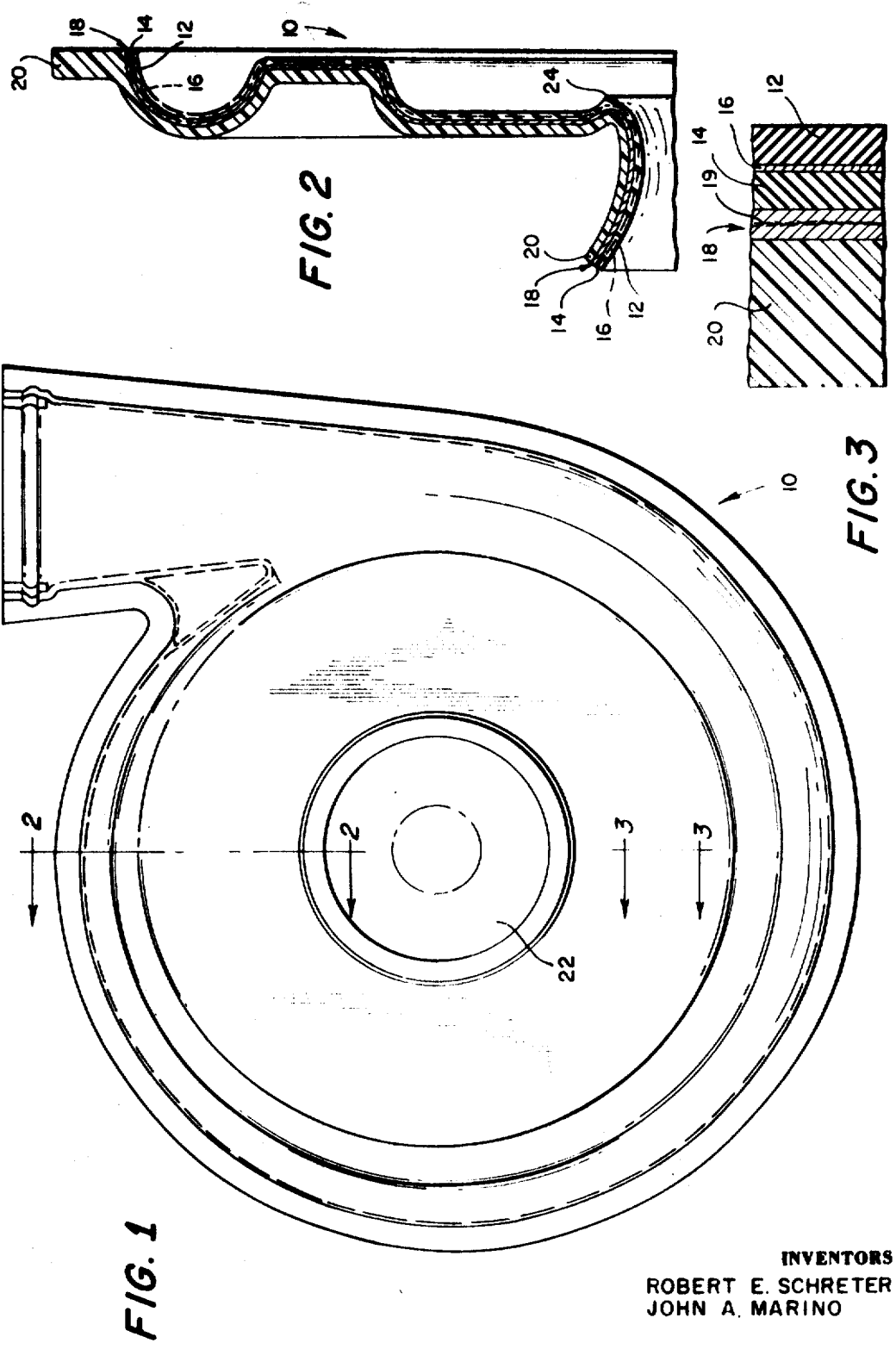

COMPOSITE MOLDING PROCESS AND PRODUCT

This invention relates to lamination, and more particularly to processes for molding laminated articles, and to laminated articles composed of an elastomeric surface layer and a backing layer of reinforced synthetic resin.

Reinforced plastics generally have poor abrasion resistance properties which limit their uses in applications in which severe abrasion is encountered from either airborne particles or from surface friction. On the other hand, elastomers exhibit excellent abrasion resistance, but do not possess the rigidity or strength that can be obtained with reinforced plastics. Therefore, composite articles having an elastomeric surface layer and a reinforced plastic backing layer possess a combination of desirable abrasion resistance and strength.

Elastomers have been applied to the surface of already molded reinforced plastic surfaces with satisfactory bonding results after extensive preparation of the plastic surface, but the dimensions of the molded article are changed by the addition of a layer of elastomer. While this procedure can be used to produce articles that do not possess precise surface dimensions, if dimensional accuracy is important, an expensive and time-consuming secondary finishing operation is usually necessary to obtain the desired surface dimensions for the elastomeric coating layer. Thus, there has existed a need for a process in which a composite article having an elastomeric surface can be manufactured to the exact dimensions of a mold surface to produce an accurately dimensioned article surface without a secondary finishing operation.

However, the problems of adequately bonding a synthetic resin backing layer to an elastomeric surface coating such as a polyurethane, has prevented general commercial implementation of a molding process for making composite articles having an elastomeric surface and a synthetic resin backing layer.

Generally, elastomers are chemically classified as nonpolar and completely saturated substances. Synthetic resins which have a highly polar chemical structure, such as polyester resins, are difficult to adhere directly to layers of elastomer because the chemical dissimilarity of the resin and the elastomer prevents the formation of strong interfacial bonds.

Accordingly, the present invention provides a process for molding a composite article including an elastomeric surface layer and a synthetic resin backing layer. The article is manufactured to the dimensions of the mold surface so that a secondary finishing operation is not required, and the synthetic resin layer is firmly bonded to the elastomeric surface layer.

The mold surface is first treated with a release agent, a step that is followed by applying a first coating of an elastomer on the treated mold surface and curing the elastomer just long enough to achieve a tack-free surface of the first coating. A second coating of liquid elastomer is applied to the tack-free surface of the first coating, and discrete fibers are deposited on the surface of the liquid second coating of the elastomer. The fibers are selected to be long enough to form a substantially continuous coating at the surface of the second liquid coating and to still protrude into the adjacent layers of the article. Subsequently, at least one thin layer of synthetic resin is applied to the coating of fibers before the second elastomer coating is solidified. The resin coating is mechanically worked to remove entrapped air.

Preferably, a thin layer of catalyzed resin is applied to the exposed surface of the continuous coating of fibers, while the second elastomer coating is still liquid, and the exposed surface of the resin is rolled to remove entrapped air. The rolling operation creates a composite layer that contains bonding fiber and intermingled elastomer and resin. This composite layer is located between the second elastomer coating and the synthetic resin backing.

Preferably, the first outer coating of elastomer is reinforced while still liquid, by laying a porous web of reinforcing material, such as a woven fabric onto its surface. This reinforcing web greatly increases the tear strength and tensile strength of the finished elastomeric surface and dramatically increases the flexural strength of the finished composite article.

The invention also comprises a strong, abrasion-resistant, molded composite article comprising an outer layer of elastomer molded to precise surface dimensions and including a first outer coating and a second coating; a composite layer including bonding fibers which form a fiber layer; and intermingled elastomer and synthetic resin; and a synthetic resin backing layer abutting the composite layer with the bonding fibers extending into said backing layer to mechanically bond said backing layer to said composite layer.

Preferably, the elastomer is a polyurethane, the synthetic resin is a polyester, and the bonding fibers are fiber glass.

It is also preferred to position a porous web of reinforcing material in the first outer coating layer.

The present invention permits production of rigid composite structures having complex surfaces. Articles constructed in accordance with the invention can be produced economically in a great variety of configurations and sizes. The bond between the elastomeric layer and the synthetic resin layer is strong enough to resist even severe deflection forces. Further, the elastomeric surface layer can be reinforced to greatly increase the tear strength and tensile strength of the finished elastomeric surface.

The invention resides in the novel steps, constructions, arrangements, combinations, and improvements shown and described.

The accompanying drawings which are incorporated in and constitute a part of this specification, illustrate one embodiment of the invention and, together with the description, serve to explain the principles of the invention.

Of the drawings:

FIG. 1 is a side elevation of a laminated inlet shell for a centrifugal air blower casing formed in accordance with the invention;

FIG. 2 is a vertical section taken along line 2—2 of FIG. 1; and

FIG. 3 is an enlarged vertical section taken along line 3—3 of FIG. 1.

In accordance with the process of the invention, the mold surface which is to be reproduced is first treated with a mold release agent appropriate for the elastomer to be used. The use of a mold release agent and the subsequent molding techniques utilized in the present process permit forming complex structural articles in molds having intricate surface details.

In accordance with the invention, a first coating of the elastomer is applied on the treated mold surface and the elastomer is cured just long enough to produce a tack-free surface. The application of the first coating of elastomer on the treated mold surface can be by painting, spraying, casting, or other conventional liquid application techniques. It is desirable that the elastomer be in liquid form during the application procedure to insure complete coverage of the mold surface. This requirement may necessitate the application of heat to some elastomers; others, for example polyurethanes, can be applied at room temperature.

After the elastomer has been applied to uniformly coat the mold surface, the elastomer is cured until the exterior surface of the coating is tack free. If the first coating of elastomer is cured too long, it will not bond firmly with the second elastomer coating. If the first coating is not cured sufficiently, the subsequently applied synthetic resin may work through to the surface of the finished article and lower the abrasion resistance of the finished article. The desired degree of curing can be determined by testing for the disappearance of surface adhesion properties on the elastomeric coating. As soon as the surface is tack free, curing is stopped.

In general, the application of heat permits more rapid curing of the first coating than exposure to room temperature. Subsequently, a thin liquid coating of elastomer is applied using conventional liquid application techniques, such as described above, to the semicured, tack-free surface of the first elastomeric coating.

Suitable elastomers for use in the present process and articles include polyurethanes, butadiene-styrenes, polybutadiene, ethylenespropylene copolymers, and most of the other forms of rubber. Desirably, the elastomeric prepolymer has a low viscosity at or slightly above room temperature so that it can be open cast into an open mold.

In accordance with the process of the invention, bonding fibers are deposited on the liquid second coating of elastomer. The quantity and length of the fibers are selected to be sufficient to form a substantially continuous fiber coating and to permit the fibers to protrude into the adjacent coating layers. Fibers of about one-half to 1½ inches or longer have been found to perform the required functions, with average fiber lengths of about 1 inch being preferred.

Preferably, the bonding fibers are selected to be of the same material which is used in reinforcing the synthetic resin. Thus, if fiber glass is used for reinforcing the synthetic resin, the bonding fibers are preferably of chopped fiber glass. In selecting a material of construction for the bonding fibers, the strength characteristics of the fiber, and the ability of the fiber to form strong bonds with both the elastomer and the synthetic resin backing material are important criteria. A variety of synthetic and natural fibers and metallic strands can be used with various synthetic resin backing layers including glass, cotton, hemp, polyamides, rayon, and a variety of metallic wire.

After the deposit of the chopped fibers on the thin second coat of elastomer, the chopped fibers can be rolled to remove entrapped air and to form a substantially continuous fibrous coating near the surface of the second elastomer coating. The rolling can be performed either before application of a coat of synthetic resin, or after the application of a coating of synthetic resin on the fibers.

At least one coating of synthetic resin backing is applied to the exposed surface of the bonding fibers, preferably before the second coating of elastomer solidifies. The synthetic resin backing layer is applied to the elastomer in thin coatings of resin and resin plus reinforcing material, and the first coating desirably does not contain reinforcing material. Rolling the first and subsequent resin coatings with surface rollers helps to remove entrapped air.

Surface rolling of the fiber layer and the resin coatings while both the second elastomer layer and the resin layer are liquid forms a composite region which includes the substantially continuous fiber layer, with the elastomer and resin intermingled on both sides of the fiber layer.

Suitable synthetic resins for use as the backing layer provide strength and rigidity for the composite article. Typical resins which can be used include polyesters, epoxies, polyamides, phenolics, and polystryene.

The reinforcing materials that are added to the backing layer preferably are selected from the materials described above for use as bonding fibers.

The composite article is subsequently cured using conventional curing techniques to improve the physical properties of the composite article. Some synthetic resins release significant quantities of heat while curing. Thus, it may be desirable to apply a thin coat of resin and then cure the thin coat to avoid overheating and scorching the article. The curing step can be conducted at elevated temperatures, or for some exothermic synthetic resins, by merely holding the article at room temperature for extended periods of time.

Usually, the article will be cured on the mold for a period of time and then demolded and postcured before use. After all required curing and postcuring is completed, the bonding fibers provide a mechanical linkage between the elastomer and the reinforced plastic.

When demolded, the article has the original mold surface reproduced on the elastomeric surface without any further finish work required. In addition, the composite article exhibits the overall rigidity and strength of the reinforced plastic material.

An embodiment of the article of the present invention is illustrated in FIGS. 1-3. The illustrated embodiment is the inlet half of the casing of a centrifugal air blower which must withstand abrasion by airborne particles contacting the interior of the casing. The casing shell has a complex shape and is molded to accurate interior dimensions to provide proper flow passages within the blower.

As best seen in FIGS. 2 and 3, the inlet-casing shell generally 10 comprises an outer elastomer layer which is molded to provide accurate surface dimensions and includes a first coating 12, and a second coating 14 adherently bonded to the first coating. A porous mat 16 is positioned at the interface of the first and second coatings. This fiber mat can conveniently be deposited onto first coating 12 while this coating is still wet. Surface tension will tend to cause mat 16 to float on the liquid first coating. A fiber glass mat is preferred and improves the tear strength of the elastomeric surface layer and surprisingly increases the flexural strength of the entire composite article by as much as 25 percent.

A conglomerate layer 18 including a substantially continuous coating of bonding fibers 19, and intermingled elastomer and synthetic resin, is laminated to the second coating. This conglomerate layer can be formed by depositing bonding fibers 19 and liquid synthetic resin on the second coating 14 of elastomer while the second coating and the resin are liquid, and rolling the exposed surface of the synthetic resin.

Generally, elastomer predominates in the portion of the composite layer adjacent to the elastomeric coating layers, and synthetic resin predominates in the portion of the composite layer positioned adjacent the synthetic resin backing layer described below. However, by mechanically working the surface of the synthetic resin layer while it and the second elastomer layer are still liquid, the elastomer and the synthetic resin are intermingled to an extent that can be visibly observed when the resin and the elastomer are dyed contrasting colors.

The second coating 14 of elastomer may also contain small amounts of synthetic resin, if the mechanical working of the synthetic resin and the bonding fibers 19 is vigorous and applied for a long period of time.

A reinforced synthetic resin backing layer 20 is adhered to composite layer 18. The synthetic resin backing layer is preferably formed by a buildup of thin coatings of resin and reinforcing fibers which are alternately applied and then cured to provide the required stiffness and strength for the finished composite article.

After the molded article is cured, bonding fibers 19 provide a mechanical linkage between the elastomer surface and the reinforced plastic. A majority of the fibers are firmly anchored into both the cured elastomer coating and the plastic resin. Because the first coating 12 of elastomer is not allowed to fully cure before application of the second coat 14, the first coating of elastomer is firmly bonded to second coating.

When demolded, the finished article has the original mold surface reproduced on the elastomer surface and finish work is not required. As illustrated in FIG. 2, the inlet shell has complex contours in its surface including an inlet opening 22 and an integral shoulder 24 positioned around the inlet opening. The finished composite article exhibits the rigidity and strength of the reinforced plastic used in the manufacturing process.

Reinforcing mat 16, positioned between the first and second coatings, greatly increases the tear strength and tensile strength of the finished urethane surface and provides dramatic increases in the flexural strength of the overall composite article.

The following example is merely illustrative and is not to be understood as limiting the scope and underlying principles of the invention in any manner. All percentages referred to herein are by weight unless otherwise specifically indicated.

In this example, the inlet half of a casing for a centrifugal air blower, such as illustrated in the drawings, is produced by bonding a fire-retardant polyester resin impregnated with chopped glass fibers to a polyurethane coating.

All dirt and foreign material are removed from the surface of a mold pattern by wiping the surface with acetone. The pattern surface is then sprayed with a modified silicone elastomer, mold release agent (sold under trade name Nonstickenstoffe made by Contour Chemical Co.) to insure release of the composite article after molding.

A batch of liquid polyether polyurethane prepolymer (sold under the trademark Adiprene L-100 by DuPont) and a 4, 4'-methylene-bis-2 chloroaniline curing agent (sold under the trademark Moca by DuPont) is mixed in the following ratio: 13.5 parts curing agent per 100 parts polyurethane. The pot life of the polyurethane-curing agent mixture is about 30 minutes at room temperature.

A generous coating of the elastomer-curing agent mixture is applied to the entire pattern surface to be coated by painting the pattern surface with a brush. With reference to FIG. 2, a thick first coating of elastomer is provided at shoulder 24.

A previously cut piece of 10-ounce woven glass cloth is subsequently laid onto the wet polyurethane coating.

The wet first coating of polyurethane is permitted to cure for several hours at room temperature until a tack-free condition exists on the surface.

A second coat of polyurethane-curing agent mixed in the same weight ratio as the first coating is applied to the entire surface of the tack-free coating. Immediately after applying the second coating, the entire surface of the second coating is covered with a layer of chopped glass fibers having an average length of about 1 inch and the surface of the chopped fibers is thoroughly rolled to remove entrapped air.

Immediately after rolling the surface of the fibers, a coat of polyester resin is applied to the surface of the fibers.

The polyester resin is mixed in two separate pots before application to the mold. In one pot 50 parts of polyester resin which contains styrene monomer (sold under the trademark Selectron 58053 by P.P.G. Industries) and 1 part diethylaniline promoter are mixed. In the second pot 50 parts of the same polyester resin is mixed with 4 parts of benzoyl peroxide catalyst (sold under the trade name ANS–50 by the Lucidol Division of Wallace & Tiernan).

Equal quantities of the mixtures from the two separate pots are mixed just prior to application so that the resulting mixed resin contains 2 percent ANS–50 and 0.5 percent diethylaniline.

A full coat of mixed resin is applied to the pattern and a layer of fiber glass and resin is then applied on the resin coating. Subsequently, the surface of the glass and resin layer is thoroughly rolled out to remove entrapped air. Glass and resin are again applied to the pattern until the thickness of the glass and resin layer is one-eighth–three-sixteenths inch at which time the mold is set aside to cure at room temperature. Curing at this time is desirable to avoid excessive heat buildups caused by the exothermic polymerization reaction.

After the mold has reached room temperature, additional one-eighth–three-sixteenth-inch layers of resin and glass are alternately applied and then cured, until the thickness of the backing layer is about three-eighth inch.

The finished inlet casing shell is allowed to cure on the mold at room temperature for 48 hours and then demolded. The polyurethane layer reaches its full strength after 2 weeks at room temperature or several hours at 200° F.

The present invention thus permits the production of composite articles having an elastomeric surface which possess superior abrasion resistance to that of metals. Because simple open-casting techniques and inexpensive molds can be used to produce complexly contoured articles in accordance with the process, the cost of setting up a fabricating facility for a complex article such as an involute scroll-type housing for a turbocompressor, is one-half to one-third the cost of a facility for producing the same article using a standard metal-forming technique. Also, the material and labor costs of fabricating complexly contoured articles according to the present invention is from 25–40 percent lower than the costs involved in metal-forming processes.

The invention in its broader aspects is not limited to the specific details shown and described and variations can be made from such details without departing from the principles of the invention and without sacrificing its chief advantages.

What is claimed is:

1. A process for molding a composite article including an elastomeric surface layer which is molded to predetermined dimensions and contours, and a synthetic resin backing layer which provides structural strength comprising:
    a. treating a mold surface with a release agent;
    b. applying a first coating of an elastomer on the treated mold surface and curing the elastomer just long enough to produce a tack-free surface;
    c. applying a second coating of liquid elastomer to the tack-free surface of the first coating;
    d. depositing bonding fibers on the liquid second coating of elastomer;
    e. applying a thin layer of synthetic resin to the exposed surface of the fiber layer and rolling the exposed surface of the article to remove entrapped air;
    f. applying additional synthetic resin and reinforcing material to provide stiffness and strength for the composite article; and
    g. curing the composite article.

2. The process of claim 1 in which a porous web of reinforcing material is placed on the first coating of elastomer while the first coating is fluid, to increase the tear strength of the elastomeric surface of the article.

3. The process of claim 2 in which the elastomer is a polyurethane.

4. The process of claim 3 in which the elastomer is a polyether polyurethane.

5. The process of claim 1 in which the bonding fibers are chopped fiber glass strands.

6. The process of claim 5 in which the bonding fibers are rolled to cause the bonding fibers to form a substantially continuous coating on the surface of said first coating of elastomer.

7. A process for molding a composite article including a polyurethane surface layer which is molded to predetermined external dimensions, and a reinforced polyester backing layer which provides structural strength comprising:
    a. treating a mold surface with a release agent;
    b. applying a first coating of polyurethane on the treated mold surface, and curing the polyurethane just long enough to produce a tack-free surface;
    c. applying a second coating of polyurethane to the tack-free surface of the first coating;
    d. depositing fibers on the liquid second coating of polyurethane and working the fibers to form a substantially continuous layer of fibers, the fibers being long enough to form the continuous fiber layer and still protrude into the adjacent layers; and
    e. applying at least one coating of polyester resin to the exposed surface of the second polyurethane coating, said resin coating being applied before the second polyurethane coating completely solidifies.

8. The process of claim 7 in which the polyurethane is polyether polyurethane.

9. The process of claim 7 in which chopped fiber glass strands are applied on the liquid second coating of polyurethane and rolled to form a continuous coating.

10. The process of claim 9 in which the liquid surface of the polyester resin coating is rolled to remove entrapped air and to cause the bonding fibers to form a substantially continuous fiber coating.

11. The process of claim 7 in which a porous web of reinforcing material is placed on the first coating of polyurethane while the first coating is fluid, to increase the tear strength of the elastomeric surface of the article.

12. A strong, abrasion-resistant, molded composite article comprising:

a. an elastomer layer molded to accurate surface dimensions and contours including a first outer coating and a second coating;
b. a composite layer abutting said second coating and including bonding fibers which form a fiber layer, and intermingled elastomer and synthetic resin; and
c. a synthetic resin backing layer abutting the composite layer with the bonding fibers extending into said backing layer to mechanically bond said elastomeric layer and said backing layer.

13. The article of claim 11 in which a porous fibrous mat is positioned between said first and second coatings of said elastomeric layer.

14. The article of claim 12 in which the elastomer is a polyurethane, the synthetic resin is a polyester, and the bonding fibers are fiber glass.

15. An inlet half of a casing for a centrifugal air blower comprising:

a. a polyurethane layer molded to accurate surface dimensions and contours and including a first coating and a second coating;
b. a composite layer abutting said second coating and including bonding fibers which form a fiber layer, and intermingled elastomer and synthetic resin;
c. a synthetic resin backing layer abutting the second layer with the bonding fibers extending into said backing layer to mechanically bond said elastomeric layer and said backing layer; and
d. the inlet casing half having a generally annular shape and including a central inlet opening with the polyurethane layer providing an abrasion-resistant surface for the interior of the casing.

16. The article of claim 14 in which a porous fibrous mat is positioned between said first and second coatings of said elastomeric layer.